April 1, 1958 D. R. WYGLE 2,828,793
WIRE CAGE FORMING DEVICES
Filed Dec. 1, 1955 2 Sheets-Sheet 2

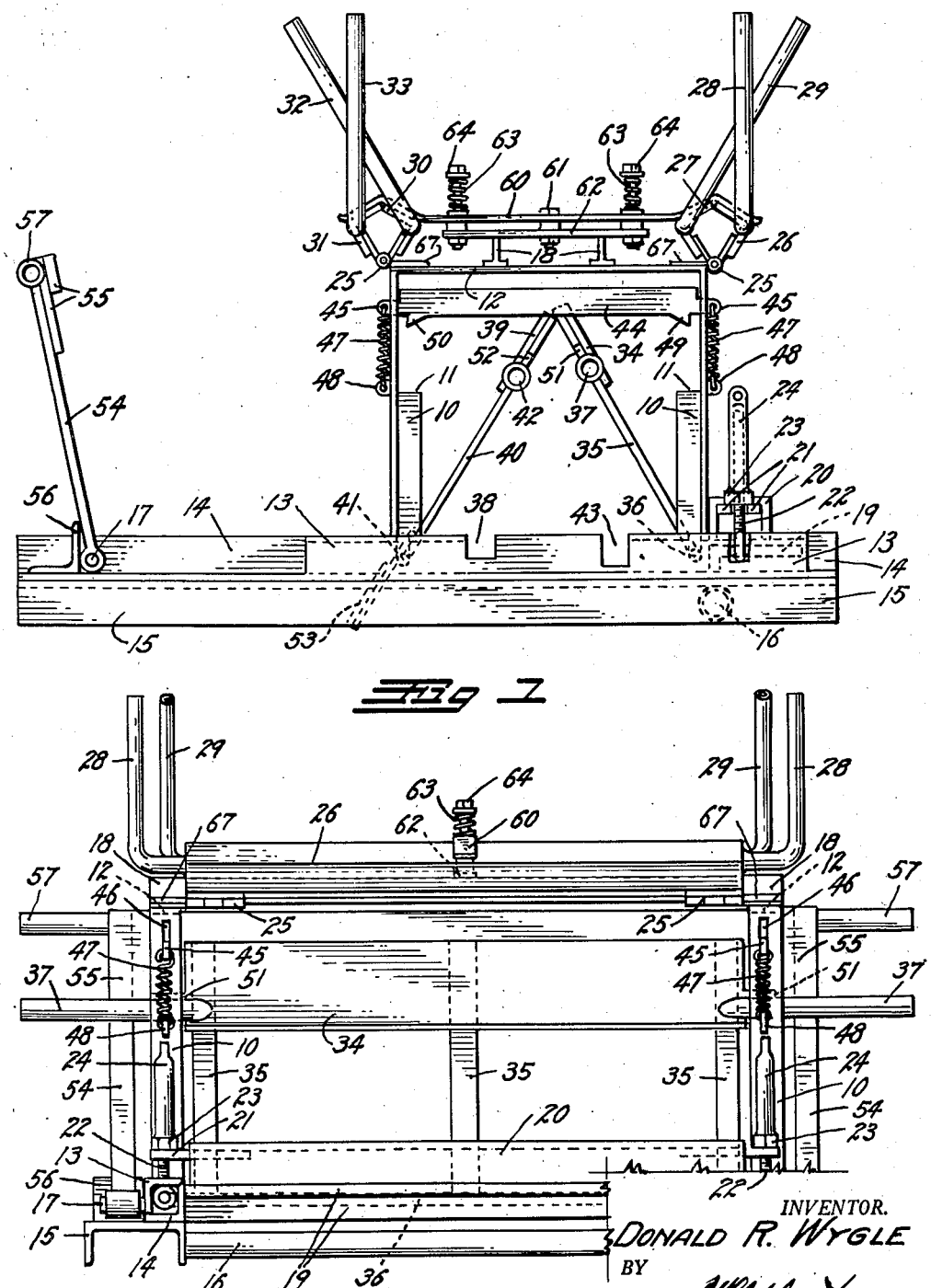

INVENTOR
DONALD R. WYGLE
BY
ATTORNEY

United States Patent Office 2,828,793
Patented Apr. 1, 1958

2,828,793

WIRE CAGE FORMING DEVICES

Donald R. Wygle, Las Animas, Colo.

Application December 1, 1955, Serial No. 550,411

6 Claims. (Cl. 153—17)

This invention relates to a device for manufacturing woven wire cages or containers, and is more particularly designed for manufacturing multiple animal cages for use on fur farms, and has for its principal object the provision of a simple, hand operated, economical, portable device which will efficiently, rapidly and accurately fold strips of woven wire netting to form a continuous series of rectangular animal cages which can be separated into individual cages or used as multiple cages as desired.

Another object is to provide a device of this character which will form uniformly spaced and accurately formed 90° bends in strip material.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a left side eelvational view of the improved cage forming device. The appearance of the right side of the device is similar to the side illustrated.

Fig. 2 is a front elevational view of the improved cage forming device, looking toward the right extremity of Fig. 1.

Figure 3:
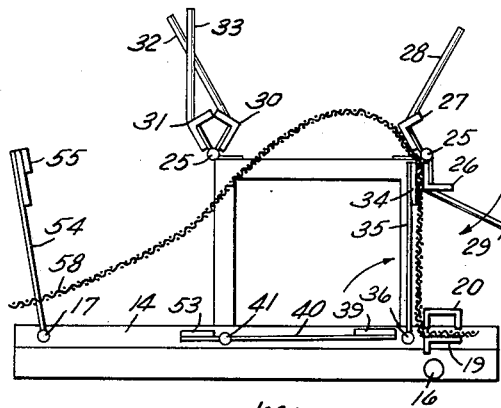
Figs. 3, 4, 5, 6 and 7 are diagrammatic views, illustrating various steps in the production of a wire cage by the use of the improved device.
Figure 4:
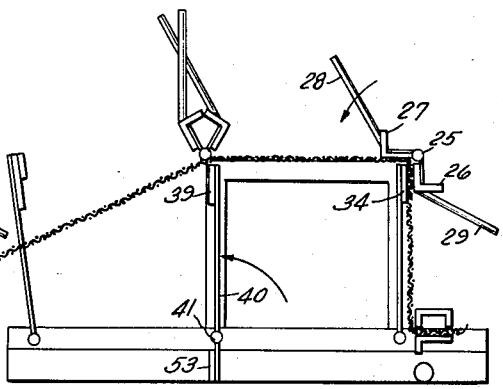
Figure 5:
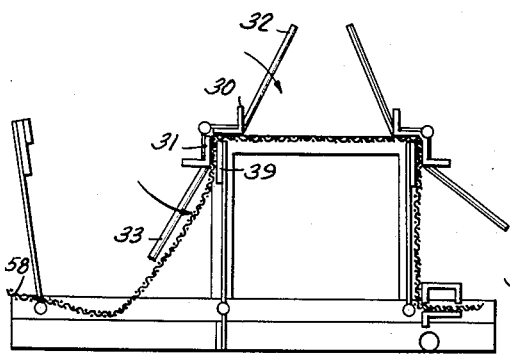

The improved cage forming device is supported from two identical side frame structures, each side frame structure consisting of two vertical uprights 10, preferably formed from angle iron with the upper portion of one leg of each angle iron cut away, as shown at 11. The two uprights 10 of each side frame structure support a horizontal top bar 12 and the uprights are welded to and arise from rectangular boxes 13 formed in the angle of a base angle iron 14 which is welded or otherwise secured along the top of a base channel iron member 15.

The two side frame structures as above described are maintained in rigid spaced-apart parallel relation by means of a brace pipe 16, a brace rod 17, two top cross members 18, and a transversely extending anvil plate 19, all of which, are welded or otherwise fixedly secured at their extremities between the two side frame structures.

A channel-shaped clamping bar 20 rests upon and extends throughout the length of the anvil plate 19. The clamping bar 20 is provided, at each of its extremities, with a pair of spaced, outwardly extending tongues 21. A jackscrew 22 is arranged to be swung between each pair of tongues 21, and a nut 23 threaded on each jackscrew is designed to clamp the tongues downwardly, thereby clamping the clamping bar 20 toward and against the anvil plate 19. One of the jackscrews is hingedly mounted in any desired manner in each of the forward boxes 13 so that it may swing sidewardly in a slot formed in the box so as to completely release the clamping bar 20. Each of the nuts 23 is mounted on a screw-enclosing sleeve 24, rotation of which acts to tighten or loosen the nut on the jackscrew. The sleeves 24 may be rotated from any desired wrench device.

A conventional double-leaf hinge 25 is welded or otherwise mounted on a hinge plate 67 at each upper corner of each side frame structure to support four hingedly-mounted transversely-extending, bending angles, there being a first bending angle 26 and a second bending angle 27 mounted on the two leaves of the two forward hinges 25 and a third bending angle 30 and a fourth bending angle 31 mounted on the two leaves of the two rear hinges 25. The first bending angle 26 is provided at its extremities with handles 28, the second bending angle 27 is similarly provided at its extremities with handles 29. The two bending angles can be swung about the axis of the forward hinge members 25 by swinging the bending handles 28 and 29 forward and back. The third bending angle 30 is provided at its extremities with handles 32 and the fourth bending angle 31 is provided at its extremities with handles 33.

A first press plate 34 is mounted on arms 35 extending from a first cross shaft 36, the extremities of which rest in notches formed in the upstanding legs of the base angles 14 below the first bending angle 26. A pair of press plate handles 37 are welded or otherwise secured to the extremities of the first press plate and extend oppositely outward from the extremities thereof. The press plate 34 is free to be swung downwardly to a horizontal position, with its handles 37 entering receiving notches 38 in the upstanding leg of the base angle 14, or to a vertical position with its handles 37 entering the cut away portions 11 of the pair of vertical uprights 10.

A second press plate 39 is similarly mounted on arms 40 extending from a second cross shaft 41, the extremities of which rest in receiving notches formed in the upstanding leg of the base angle 14 below the third bending angle 30. The second press plate 39 is also provided at its extremities with outwardly extending handles 42 and is free to be swung to a horizontal position with its handles 42 resting in receiving notches 43 in the base angle 14 or to a vertical position with the handles 42 entering the cut away portions 11 of the rear pair of vertical uprights 10.

The two press plates 34 and 39 may be locked in their vertical positions by means of a pair of latch bars 44, there being one latch bar mounted for vertical movement in each side frame structure. The latch bars 44 are formed with tongues 45 at their extremities which extend through vertically positioned guide slots 46 in the vertical uprights 10. The latch bars are constantly urged downwardly in the slots 46 by means of tension springs 47 one of which extends downward from each tongue 45 to an attachment boss 48 on the adjacent upright 10. Each latch bar 44 is provided with a forward latch tooth 49 and a rear latch tooth 50. The forward teeth 49 snap over and engage latch lugs 51 on the first press plate 34 and the rear teeth 50 similarly snap over similar lugs 52 on the second press plate 39 when the press plates are swung to the vertical position so as to lock the plates in a vertical position.

The bending angles 26, 27, 30 and 31 may be latched in the vertical position of Fig. 1 by means of a resilient latch bar 60 extending longitudinally of the center line of the device and secured by means of a central bolt 61 to a center bar 62 which is welded or otherwise secured between the top cross members 18. The extremities of the latch bar 60 are bent in an inverted V-shape so that they will snap over the bending angles, when the latter are swung upwardly as shown in Fig. 1, so as to grip and maintain them in the vertical position. The gripping action of the resilient latch bar 60 is increased by means of compression springs 63. The springs 63 surround spring bolts 64 which extend upwardly through the extremities of the center bar 62 and through the extremities of the resilient latch bar 60 at each side of the center bolt 61. Thus, the springs 63 act to constantly and resiliently urge the extremities of the latch bar 60 downwardly.

A third press plate 53 is secured to and adjacent to the second cross shaft 41 and projects from the shaft axis in an opposite direction to the press plate 39 so that when the second press plate is swung downwardly the third press plate will swing upwardly. All of the press plates extend completely across the device between the two side frame structures and all can be removed by simply lifting their respective cross shafts from their receiving notches in the base angle 14.

The extremities of the brace rod 17 extend through and project outwardly from the two base angles 14 at each side of the device. A swinging arm 54 is hingedly mounted on each projecting extremity of the brace rod 17 to support a fourth press plate 55 which extends across the device and which can be swung from a horizontal to a vertical position. An angle stop clip 56 is mounted on each base angle 14 rearwardly of each arm 54 to limit the rearward swing of the fourth press plate 55. The fourth press plate is provided with suitable handles 57 projecting oppositely outward therefrom.

Figure 6:
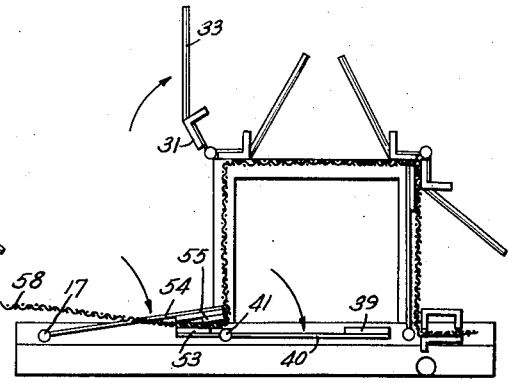
Figure 7:
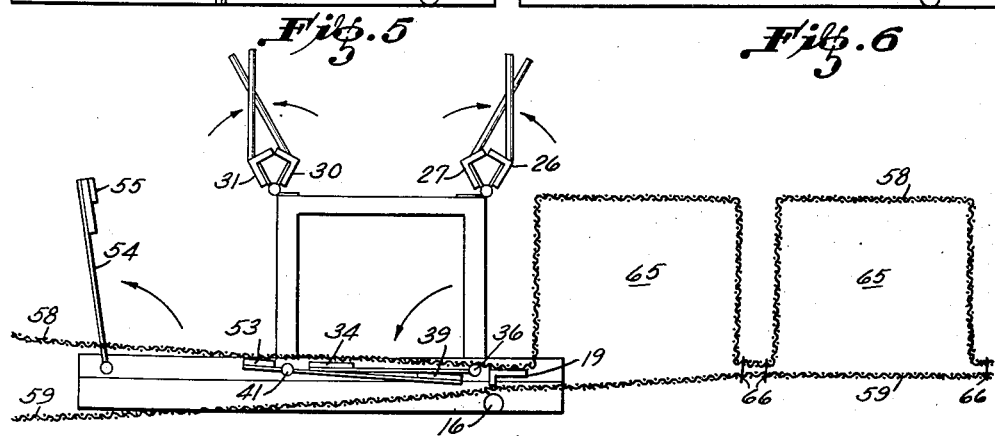

The device is designed to form rectangular woven wire cages, such as indicated at 65, in Fig. 7, from continuous strips of woven wire such as indicated diagrammatically at 58 and 59 in Figs. 3 through 7.

The operation is initiated by bringing the end of the woven wire strip 58 beneath the fourth press plate 55 and between the side frames of the device over the press plates 34, 39 and 53, with the latter lying in their horizontal positions. The forward extremity of the wire strip is brought over the anvil plate 19 and clamped tightly thereto by means of the clamp bar 20 and the jackscrew nuts 23.

The press plate 34 is now swung upwardly by means of its handles 37, to bend the wire sharply upward against the rear side of the clamp bar 20 and is locked in the vertical position by means of the latch bars 44. The first bending angle 26 is now swung downwardly to clamp the wire strip against the forward face of the press plate 34 so that the device will present the appearance diagrammatically indicated in Fig. 3.

The handles 28 are now swung to the rear to bring the bending angle 27 downwardly to bend the wire strip rearwardly and downwardly over the top edge of the press plate 34. The bending is continued slightly beyond 90° so that the natural resiliency of the wire will spring it back to an accurate 90° corner. The press plate 39 is now swung upwardly by means of its handles 42 and latched in its vertical position by means of the latch bar 44 so that the device will present the appearance diagrammatically indicated in Fig. 4.

The handles 32 are now swung forwardly to cause the third bending angle 30 to clamp the wire firmly against the top of the press plate 39 and the handles 33 are swung rearwardly to bring the fourth bending angle 31 against the wire strip so as to bend it at a sharp 90° angle downwardly over the top of the press plate 39. The handles 32 are forced forwardly to bend the wire strip over the top of the press plate 39 sufficiently so that it will spring back to an accurate 90° corner. The device is now in the position diagrammatically indicated in Fig. 5.

The handles 33 are now lifted and the fourth bending angle 31 is latched in the elevated position and the fourth press plate 55 is forced forwardly and downwardly against the wire strip by means of its handles 57 to exert a stretching or tightening effect on the strip. The second press plate 39 is now released from the latch bars 44 and swung forwardly and downwardly to cause the third press plate 53 to swing rearwardly and upwardly so as to bend the wire sharply over the end of the fourth press plate 55 as shown in Fig. 6. The woven wire strip has now been formed into a rectangular enclosure with two upper internal sharp corners and two lower external sharp corners.

The bending angles 26, 27 and 30 are now elevated to their normal position where they are latched in place by means of the latch bar 60. The fourth press plate 55 is lifted so as to rest against its angle clip stops 56. The first press plate 34 is released from the latch bar 44 and lowered to a horizontal position. The clamping bar 20 is released, by unscrewing the nuts 23 and swinging the jackscrew 22 outwardly, so that the clamping bar 20 can be slid sidewardly from the device. The bent wire strip is now forced forwardly through the device and the second woven wire strip 59 is forced forwardly through the device over the brace pipe 16. The second wire strip 59 is secured to the lower horizontal portions of the first wire strip 58 by means of wires or split wire rings, ring clinchers, or other fastening devices, such as indicated at 66 as shown diagrammatically in Fig. 7.

The clamping bar 20 is now returned to a position to clamp the trailing portion of the preformed woven wire strip 58 to the anvil plate 19 and the above described procedure is repeated to produce a second rectangular woven wire enclosure 65. This is continued through the entire length of the woven wire strips 58 and 59 to produce a continuous series of rectangular cages 65, as shown in Fig. 7. The cages can be used as a connected series or can be cut apart to form independent cages. The cages as formed by this device have open ends which can be closed by rectangular pieces of woven wire or by means of door plates to form complete cage enclosures. While the invention has been described for use with woven wire strips, it is conceivable that it could be used for forming rectangular containers or enclosures from sheet metal strips or other materials. In use the device would preferably be supported on a suitable support for convenient operation. Such a support could comprise trestles, or a bench or suitable supporting legs.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A device for forming an elongated strip of material into rectangular convolutions comprising: two vertical, rigid, spaced-apart, rectangular side frame structures positioned in parallel, spaced-apart relation to receive said strip therebetween, each structure having a forward and a rear extremity, the extremities of each structure being aligned transversely of said strip with the extremities of the other structure; an anvil plate extending between and being fixedly secured to said structures adjacent the bottom of the forward extremities thereof; a clamping bar extending between said structures and resting on said anvil plate; means for urging said bar toward said plate to clamp the forward extremity of said strip therebetween; a cross shaft positioned between said structures immediately rearward of said clamping bar; a first press plate radially mounted on said shaft and adapted to swing upwardly and forwardly toward said bar to form an upturned external angle bend in said strip alongside the rear edge of said bar and to swing vertically upward therefrom and against said strip to form a first vertical portion therein; means for latching said first press plate in the vertical position; a first bending angle; a second bending angle, said two bending angles being hingedly mounted between the forward extremities of said structures adjacent the top thereof; means for swinging the first bending angle downwardly against the forward face of the vertical portion of said strip; means for swinging the second bending angle rearwardly to bend said strip over the upper edge of said first press plate to form by a first internal bend a horizontal portion therein; and means for forming a second internal bend in said strip to form a second vertical portion therein.

2. A device for forming an elongated strip of material into rectangular convolutions as described in claim 1 in which the means for forming the second internal bend in said strip comprises: a third bending angle; a fourth bending angle, said third and fourth bending angles being hingedly mounted at and extending between the rear extremities of said structures adjacent the top thereof; a second cross shaft extending between said structures below said third and fourth bending angles; a second press plate radially supported from said second cross shaft and extending betwen said structures; means for latching said second press plate in the vertical position; means for swinging the third bending angle downwardly against the horizontal portion of said strip; and means for swinging the fourth bending angle downwardly and forwardly to bend said strip over said second press plate to form a second vertical portion therein, and means for forming a second external 90° bend in said strip.

3. A device for forming an elongated strip of material into rectangular convolutions as described in claim 2 in which the means for forming the second external 90° bend in said strip comprises: a third cross shaft extending between said structures adjacent the rear extremity thereof; a third press plate radially mounted on said third cross shaft and extending between said structures and positioned so that when swung forwardly and downwardly it will contact the second vertical portion of said strip; a fourth press plate radially mounted on said second cross shaft; and means for swinging said fourth press plate rearwardly and upwardly to bend said strip rearwardly over said third press plate at a 90° angle to form an external 90° bend at the lower extremity of said second vertical portion, and means for latching all of said bending angles in their inoperative positions.

4. A device for forming an elongated strip of material into rectangular convolutions as described in claim 3 in which the latching means comprises: a resilient latch bar supported between said structures and lying substantially on the longitudinal center line thereof; and inverted V-shaped bends formed in the extremities of said latch bar adapted to engage said bending angles when the latter are swung to their inoperative positions.

5. A device for forming an elongated strip of material into rectangular convolutions as described in claim 4 having resilient means acting to urge the bent extremities of said latch bar into engagement with said bending angles.

6. A device for forming an elongated strip of material into rectangular convolutions as described in claim 2 in which the means for latching the first and second press plates in their vertical positions comprises: a horizontal latch bar mounted for vertical movement in each side frame structure; a first and second latch tooth projecting downwardly from each latch bar so as to be engaged by the first and second press plates, respectively; and spring means urging said latch bars downwardly into engagement with said press plates.

References Cited in the file of this patent
UNITED STATES PATENTS

| | | |
|---|---|---|
| 1,205,769 | McGill | Nov. 21, 1916 |
| 1,402,433 | Monroe | Jan. 3, 1922 |
| 1,820,426 | Beghetti | Aug. 25, 1931 |
| 2,191,104 | Chandonia | Feb. 20, 1940 |
| 2,434,028 | Wieland | Jan. 6, 1948 |
| 2,436,278 | Willett | Feb. 17, 1948 |
| 2,699,812 | McCormack et al. | Jan. 18, 1955 |

FOREIGN PATENTS

| | | |
|---|---|---|
| 140,045 | Germany | Apr. 2, 1903 |